United States Patent [19]  [11] 4,183,389
Grosch  [45] Jan. 15, 1980

[54] HEAVY DUTY PNEUMATIC TIRE

[75] Inventor: Karl A. Grosch, Roetgen, Fed. Rep. of Germany

[73] Assignee: Uniroyal GmbH, Aachen, Fed. Rep. of Germany

[21] Appl. No.: 895,322

[22] Filed: Apr. 11, 1978

[30] Foreign Application Priority Data

May 3, 1977 [DE] Fed. Rep. of Germany ....... 2719798

[51] Int. Cl.² .............................................. B06C 9/22
[52] U.S. Cl. ...................... 152/361 FP; 152/361 DM
[58] Field of Search ...... 152/361 R, 361 FP, 361 DM

[56] References Cited

U.S. PATENT DOCUMENTS

| 3,233,649 | 2/1966 | Isliuet et al. | 152/361 FP |
| 3,503,432 | 3/1970 | Maiocchi | 152/361 DM |
| 3,881,538 | 5/1975 | Mirtain | 152/361 FP |
| 3,949,797 | 4/1976 | Mirtain et al. | 152/361 FP |
| 3,973,612 | 8/1976 | Mezzanotte | 152/361 FP |

FOREIGN PATENT DOCUMENTS 1189401 3/1965 Fed. Rep. of Germany .... 152/361 FP

Primary Examiner—John D. Pekar
Assistant Examiner—D. W. Underwood
Attorney, Agent, or Firm—Philip Rodman

[57] ABSTRACT

A heavy duty pneumatic tire includes a carcass having a crown region and a tread portion surrounding the crown region. A reinforcement belt is disposed circumferentially about the crown region between the carcass and the tread. The reinforcement belt includes a first ply of tire cord fabric with two free lateral edge portions folded over upon itself to form two skirts and a main portion. The cords in the first ply are steel and lie at an angle of from about 16° to about 32° with respect to the equatorial plane of the tire. A second ply of tire cord fabric is superimposed upon the first ply. The cords in the second ply are of textile composition and are disposed at an angle of substantially 0° with respect to the equatorial plane of the tire. The second ply fetters or restrains the first ply onto the carcass and imparts to the carcass a substantially flat cross-sectional configuration in the crown region.

6 Claims, 8 Drawing Figures

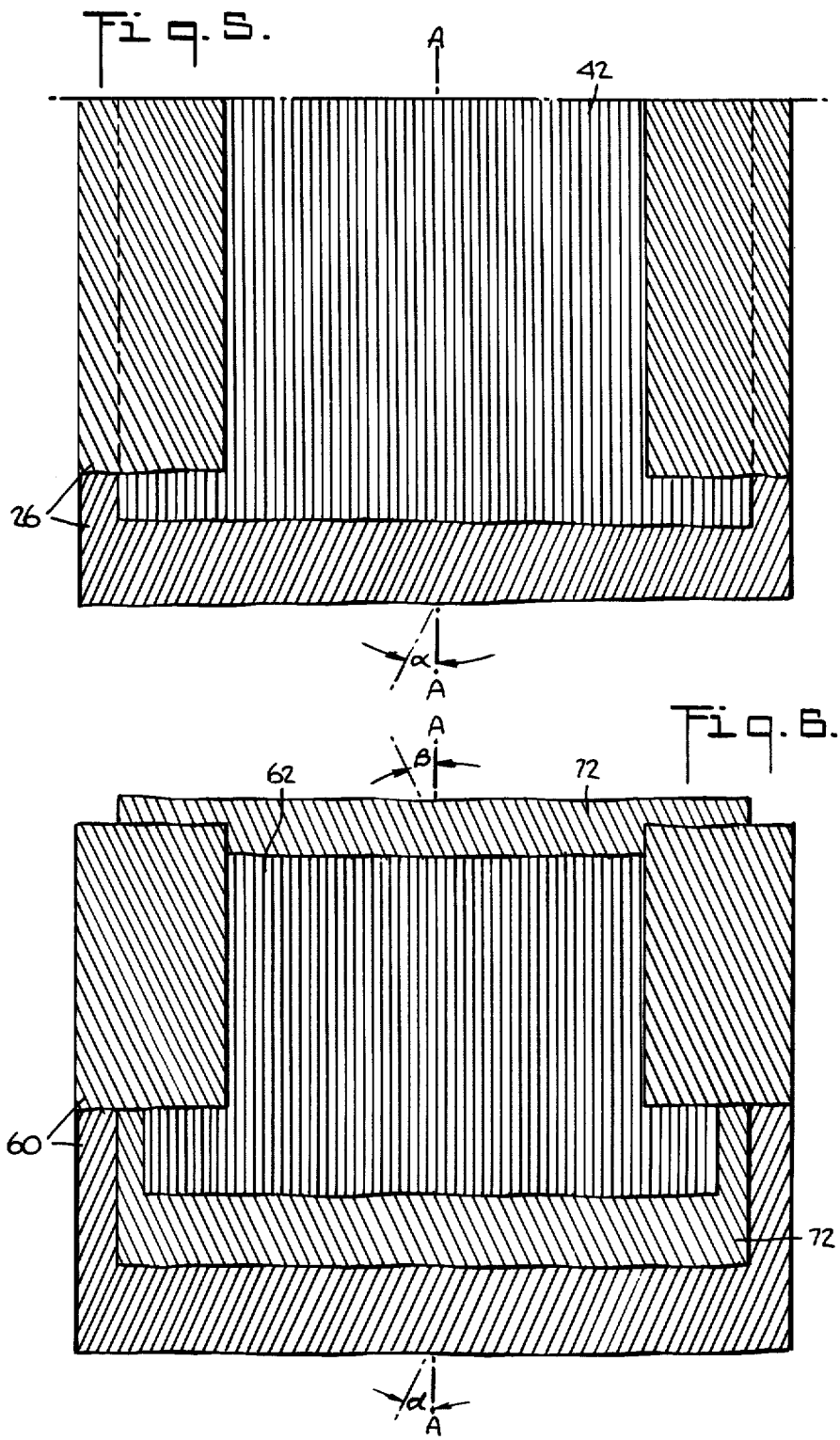

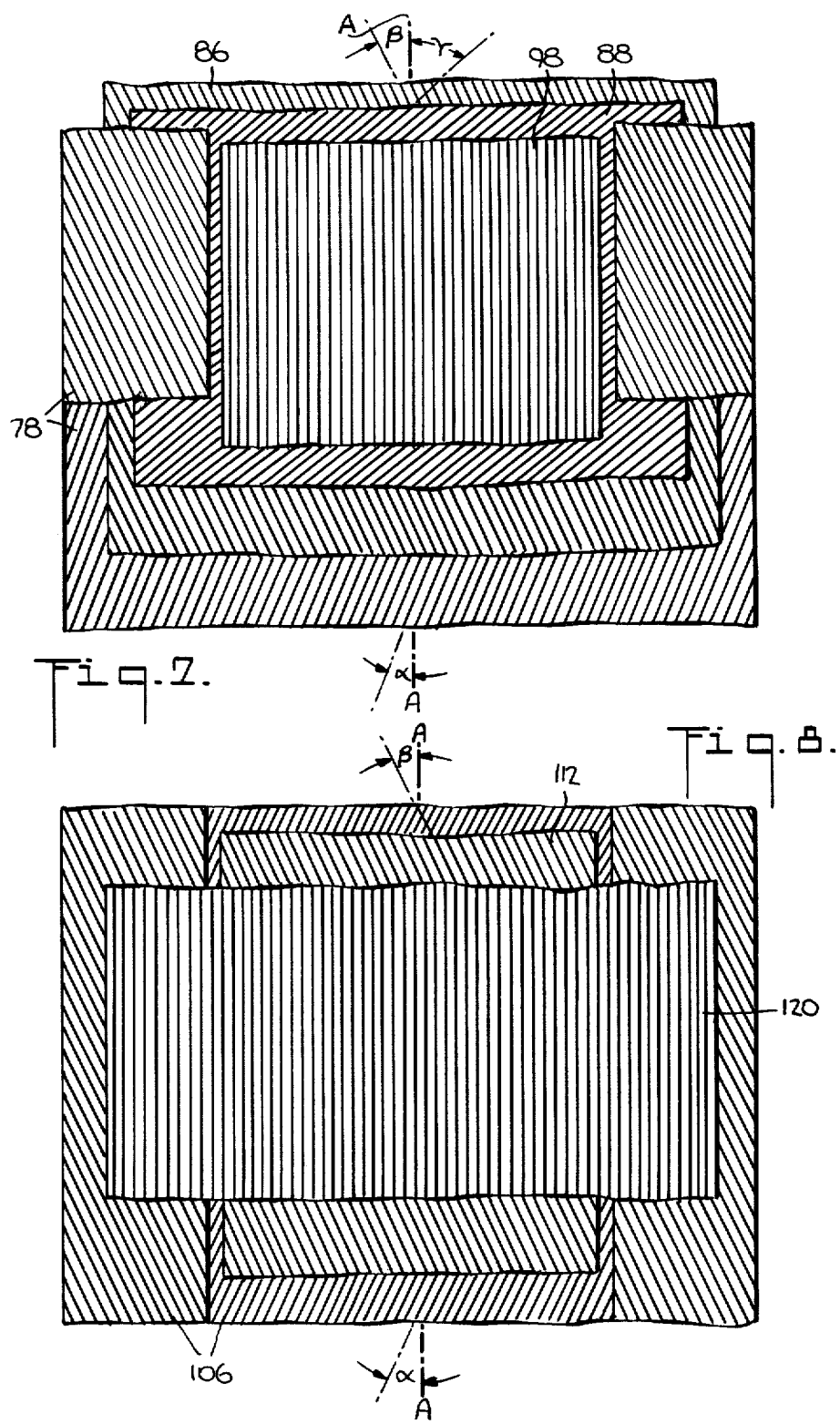

HEAVY DUTY PNEUMATIC TIRE

BACKGROUND OF THE INVENTION

1. Field of the Invention

This invention relates to pneumatic tires, and more particularly to reinforcement belts for heavy duty pneumatic tires.

2. Prior Art

It is known in the industry to construct heavy duty pneumatic tires including an annular reinforcement belt or breaker about the crown periphery of the tire between the tread and the carcass. In such constructions the reinforcement belt has a substantially planar or flat cross-sectional configuration owing to the particular cross-sectional configuration of the tire carcass in which the carcass between the point of maximum width in the sidewall and the tread is bent noticeably. The tire therefore has a relatively low elevation so that the radial height of the tire above the rim on which it is mounted is less than that of conventional heavy duty pneumatic tires.

One reinforcement belt construction for such a heavy duty pneumatic tire is described in U.S. Pat. No. 3,757,844 and includes a folded ply enclosing an unfolded ply with another unfolded ply positioned between the folds. The reinforcement elements in each ply are steel. Another reinforcement belt construction suggesting the utilization of all steel plies is disclosed in U.S. Pat. No. 3,500,890.

As noted hereinabove, heavy duty pneumatic tires have a generally flat cross-sectional configuration. This configuration must be maintained not only while the tire is inflated and in operation but during the manufacturing process as well. Known manufacturing procedures impart the flat configuration to the carcass before the reinforcement belt is placed thereon. It would be a less complex process to first position the reinforcement belt on the carcass and then shape the carcass to the desired flat configuration. Such a reinforcement belt would necessarily contain a fettering or clamping ply which would retain the reinforcement belt on the carcass and shape the carcass into the flat cross-sectional configuration. Fettering or clamping ply constructions are disclosed in U.S. Pat. Nos. 3,786,851, 3,850,219, 3,949,797 and German Patent No. 2,431,977.

The reinforcement belts which have heretofore been designed do not guarantee that when used on a standard radial carcass, the carcass will assume the desired flat cross-sectional configuration due, solely, to the effects of the reinforcement belt.

It is towards elimination of these and other problems in the prior art that the present invention is directed.

SUMMARY OF THE INVENTION

1. Purposes of the Invention

It is an object of the present invention to provide a heavy duty pneumatic tire in which the design of the reinforcement belt contributes to the substantially cross-sectional configuration of the tire in the crown region.

It is another object of the present invention to provide a heavy-duty pneumatic tire in which the reinforcement belt enhances the properties of the shoulder regions of the tire.

Yet another object of the present invention is to provide a heavy duty pneumatic tire which is simpler to manufacture than tires of conventional design.

Other objects of the present invention in part will be obvious and in part will become apparent as the description proceeds.

2. Brief Description of the Invention

Generally, the above and other objects of the present invention are accomplished by a heavy duty pneumatic tire having a radial carcass and a reinforcement belt or breaker placed between the crown region of the carcass and the tread. The reinforcement belt includes at least two radially superpositioned plies of tire cord fabric in which the cords are substantially parallel to one another in each ply. A first ply having free lateral edges has its lateral edge portions folded over to form skirts with the balance of the first ply forming a main portion having an axial width substantially equal to the width of the reinforcement belt. The cords in this first ply are of steel and lie at an angle of from about 16° to about 32° and preferably from about 18° to about 24° with the equatorial plane of the tire.

In one embodiment, a second ply of tire cord fabric having textile cords is positioned on the radially outward side of the main portion. The second ply has an axial width greater than the distance between the free edges of the skirt so that the skirts are folded onto the lateral edges of the second ply. The cords in the second ply lie at an angle of substantially 0° with the equatorial plane of the tire and exert a clamping force on the main portion of the first ply to restrain the first ply against the carcass and to impart a flat cross-sectional configuration to the carcass in the crown region.

In accordance with another embodiment of the present invention, an intermediate ply extends parallel to the first ply and is positioned on the radially outward face of the main portion of the first ply beneath the second ply. The intermediate ply has an axial width greater than the distance between the free edges of the skirts. The cords in the intermediate ply lie at an angle of between about 16° and 32° and preferably between about 18° and 24° with the equatorial plane of the tire. The skirts are folded over the lateral edges of both the intermediate and second plies. The second ply exerts through the intermediate ply a clamping force on the main portion of the first ply.

In accordance with still another embodiment, the skirts are folded directly onto the radially outward face of the main portion of the first ply. The intermediate ply is positioned between the free edges of the skirts and the second ply is superimposed over the free edges of the skirts and over the intermediate ply.

In yet another embodiment, there are at least two intermediate plies having the skirts folded over their lateral edges and a second ply having a width less than the distance between the free edges of the skirts. The intermediate ply immediately beneath the second ply may have cords lying at an angle of from 32° to about 70° with the equatorial plane of the tire.

The invention consists in the features of construction and arrangement of parts which will be detailed hereinafter and described in the appended claims.

BRIEF DESCRIPTION OF THE DRAWINGS

While the specification concludes with claims particularly pointing out and distinctly claiming the subject matter regarded as the invention herein, it is believed that the invention will be better understood from the following description when read in conjunction with the accompanying drawings, in which:

FIGS. 5 through 8 show top views of the reinforcement belts shown in FIGS. 2 through 4, respectively.

DESCRIPTION OF THE PREFERRED EMBODIMENTS

In the specification and the claims, the terms "axially inward" and "axially outward" are used with reference to a sidewall of the tire, that is, "axially inward" refers to a vector extending from the sidewall to the opposite sidewall. Conversely, "axially outward" refers to a vector extending outwardly away from the sidewall. The terms "radially inward" and "radially outward" are used with reference to the axis of rotation of the tire, that is, "radially inward" refers to a vector extending from the tread profile of the tire to the axis, while, the term "radially outward" refers to a vector extending from the axis toward the tread profile.

Figure 1:
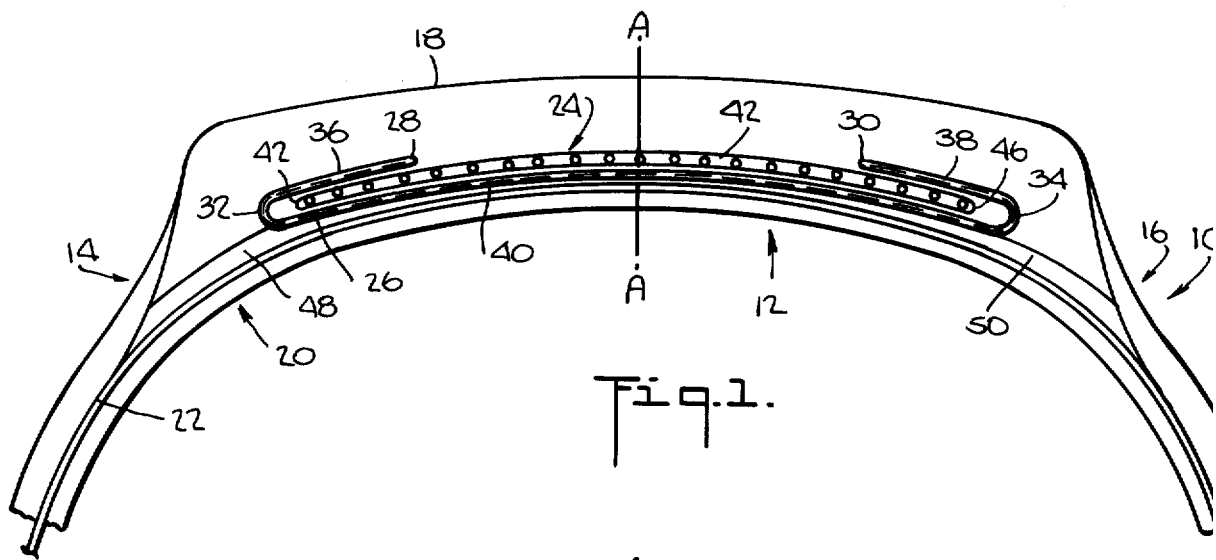
FIG. 1 represents a radial cross-sectional profile of a portion of a pneumatic tire including a reinforcement belt constructed pursuant to one embodiment of the present invention.

Referring now to the drawings, there is illustrated in FIG. 1, a portion of a pneumatic tire identified generally by the reference numeral 10. The tire 10 has a crown region 12 defined by the shoulders 14 and 16 and by a tread portion 18. In addition, the tire 10 is provided with a carcass 20 which includes at least one ply of radially extending reinforcing steel threads or cords 22.

Positioned between the carcass 20 and the tread portion 18 is a reinforcement belt or breaker in accordance with one embodiment of the present invention which is identified generally by the reference numeral 24. The reinforcement belt 24 which has a comparatively flat cross-sectional shape, is substantially coextensive with the tread portion 18 and it circles peripherally, the carcass 20.

The reinforcement belt 24 includes at least two plies of tire cord fabric in which the cords are substantially parallel to one another in each ply and are coated with a natural or synthetic elastomer.

A first ply 26 constitutes the radially innermost ply of the reinforcement belt and has two free lateral edges or free edges 28 and 30. The ply has two foldings 32 and 34 lying substantially at each lateral edge of the reinforcement belt in order to create two lateral skirts 36 and 38, folded radially outwardly with respect to a main portion 40. The main portion 40 has an axial extent substantially equal to the axial width of the reinforcement belt. The first ply 26 contains steel cords lying at an angle α of between about 16° to about 32° and preferably from about 18° to 24° with respect to the equatorial plane A—A of the pneumatic tire 10.

A second ply 42 is superimposed on the main portion 40 on its radially outward side and extends parallel to the first ply 26. It has an axial width greater than the distance between the two free edges 28 and 30 and preferably slightly less than the distance between the foldings 32 and 34 so that the skirts 36 and 38 can be folded over the lateral edges 44 and 46 of the second ply 42 as shown. This second ply 42 contains textile cords which lie at an angle of substantially 0° with respect to the equatorial plane of the pneumatic tire 10. Preferably, the cords are of nylon or aramide composition.

In accordance with the present invention, the cords in the second ply 42 act to clamp the main portion 40 of the first ply against the carcass 20 so as to restrain movement of the first ply and to impart to the carcass a flat-cross-sectional configuration in the crown region.

There may be provided cushion elements 48 and 50 of a special rubber compound at the marginal areas of the reinforcement belt 24. In such a construction, the second ply 42 will still clamp the main portion 40 against the carcass 20 except at its marginal areas. The restraining effect extends into the shoulder areas 14 and 16 so that the marginal edges of the main portion 40 are urged against the cushion elements.

Figure 2:
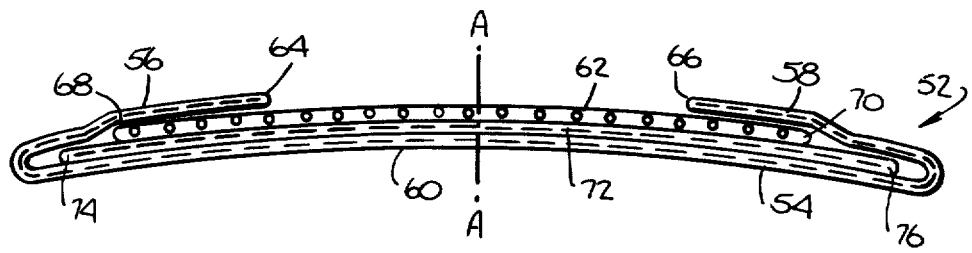
FIGS. 2 through 4 show, schematically, transverse cross-sections of reinforcement belts constructed in accordance with alternative embodiments of the present invention.

In the alternative embodiment illustrated in FIG. 2, the reinforcement belt 52 includes a first ply 54 of steel tire cord fabric. The first ply 54 has radally outwardly folded portions or skirts 56 and 58 and a main portion 60. A second ply 62 of textile cord fabric has an axial extent less than the width of the main portion 60 but greater than the distance between the free edges 64 and 66 on the skirts 56 and 58 respectively. In this embodiment, as in the embodiment illustrated in FIG. 1, the skirts 56 and 58 are folded onto the lateral edges 68 and 70 of the second ply 62. Positioned between the main portion 60 of the first ply 54 and the second ply 62 is an intermediate ply 72 of unfolded tire cord fabric in which the cords lie at an angle β of between about 16° to about 32° and preferably between about 18° and 24° with the equatorial plane A—A of the reinforcement belt. The cords in the intermediate ply may be of steel, fiberglass, aramide or other composition customarily employed in tire fabric. The precise material used is not important to the present invention. The intermediate ply 72 has an axial extent slightly greater than the second ply 62 as shown so that its lateral edges 74 and 76 are positioned beneath the skirts 56 and 58 respectively.

Figure 3:
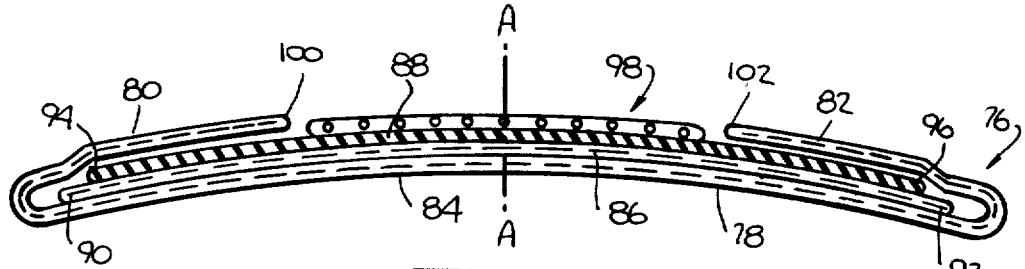

As in the first embodiment, the cords in the second ply 62 act to restrain the main portion 60 of the first ply 54 against the tire carcass and give the crown region of the carcass the desired flat cross-sectional configuration. A further alternative embodiment of the present invention is illustrated in FIG. 3 wherein the reinforcement belt 76 includes a first ply 78 folded to form skirts 80 and 82 and a main portion 84. A first intermediate ply 86 is positioned upon the radially outward surface of the main portion 84. The first intermediate ply 86 is identical to the intermediate ply 72 discussed hereinabove regarding the composition of the cords in the ply and the angle the cords make with the equatorial plane A—A of the reinforcement belt. A second intermediate ply 88 is superimposed on the first intermediate ply 86. The angle γ of the cords in the second intermediate ply with respect to the equatorial plane A—A may range from in excess of 32° up to about 70°. The second intermediate ply 88 has an axial extent slightly less than that of the first intermediate ply 86, but both plies have their lateral edges 90, 92 and 94, 96 respectively hemmed in or situated beneath the folds 80 and 82 as shown.

A second ply 98 is positioned on the radially outward side of the second intermediate ply 88 and between the edges 100 and 102 on the skirts 80 and 82. As in the previously discussed embodiments, the cords in the second ply 98 exert a clamping force on the main portion 84 of the first ply urging it against the tire carcass. As a result of the first and second intermediate plies 86 and 88 respectively, the clamping force is distributed axially to a greater extent so that it is applied over a greater area of the main portion 84 than as could be expected from an arrangement including first and second plies of similar widths without the presence of the intermediate plies. In addition, the flat-cross-sectional configuration is imparted to the carcass.

Figure 4:
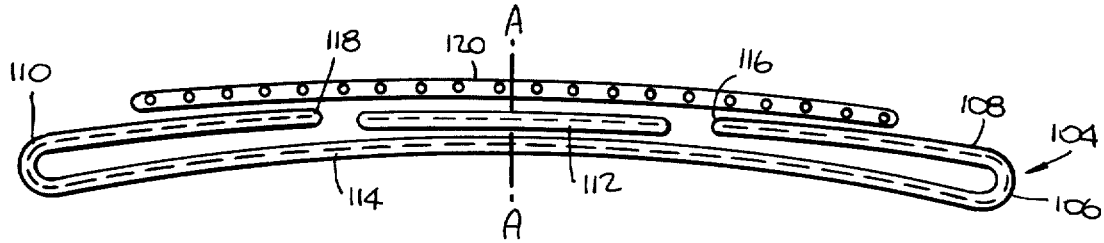

A yet further embodiment of the present invention is illustrated in FIG. 4. A reinforcement belt 104 includes a first ply 106 having skirts 108 and 110 folded radially outwardly onto the radially outward face of the first ply 106. An intermediate ply 112 is positioned on the main portion 114 of the first ply between the edges 116 and 118 of the skirts 108 and 110 respectively. This intermediate ply 112 is arranged substantially in the horizontal plane of the skirts 108 and 110 as shown. The composition of the cords in the intermediate ply 112 and their angle with respect to the equatorial plane A—A of the tire are the same as those characteristics of the intermediate plies 72 and 86 discussed hereinabove. A second ply 120 having an axial extent greater than the distance between the edges 116 and 118 is superimposed on the radially outward face of the skirts 108 and 110 as well as the intermediate ply 112. In this embodiment, the skirts 108 and 110 as well as the main portion 114 of the first ply 106 are subject to the clamping effect of the second ply and the carcass is shaped to the flat cross-sectional configuration.

As noted in the discussion of each embodiment discussed above, the second ply of the textile cord fabric clamps at least the main or unfolded portion of the first ply firmly onto the crown area of the carcass and makes sure that upon vulcanization as well as upon inflation of the tire to operating pressure the crown area of the carcass is shaped into a particularly flat-cross-sectional configuration having a low radius of curvature. The second ply provides for a firm and durable application of the first ply to the crown area of the carcass. Because of this second ply, large-size and high load-bearing capacity pneumatic tires can be maintained in a cross-sectional flat configuration in a simple and effective manner.

Furthermore because of the folded edges of the first ply the shoulders are reinforced and maintained nevertheless in a relatively low profile, with the cross-section of the shoulders being substantially smaller than in the case of customary heavy duty pneumatic tires. These shoulders have the advantage of developing less heat and of being less subject to wear.

In the embodiments described, one can advantageously use the known shrinkability of the nylon cord materials employed in order to increase the clamping effect. These cord elements of the second ply which are oriented substantially at 0° will shrink because of the temperature effects during the vulcanization to increase the clamping effect on the first ply.

It can thus be seen that the objects of the present invention, namely to create an improved heavy duty pneumatic tire have been accomplished by providing a radial carcass having a crown region and a tread portion surrounding the crown region. A reinforcement belt is disposed circumferentially about the crown region between the carcass and the tread. The reinforcement belt includes a first ply of tire cord fabric having two free lateral edge portions which are folded to form skirts with the balance of the first ply forming a main portion having an axial width substantially equal to the axial width of the reinforcement belt. The cords in the first ply are steel and lie at an angle of from about 16° to about 32° with respect to the equatorial plane of the tire. A second ply of tire cord fabric is provided having cords of a textile composition which are oriented at an angle of substantially 0° with respect to the equatorial plane of the tire. The second ply operates to fetter or restrain the first ply onto the carcass and imparts to the carcass a substantially flat-cross-sectional configuration in the crown region.

In one embodiment, the second ply has an axial width slightly less than the main portion of the first ply and the skirts of the first ply are folded over the lateral edges of the second ply. Cushion elements of a special composition may be positioned between the first ply and the carcass at the edges of the reinforcement belt.

In another embodiment, an intermediate ply of steel cord tire fabric wherein the cords lie at an angle of between about 16° and about 32° to the equatorial plane of the tire is positioned between the second ply and the main portion of the first ply, with the skirts folded over the lateral edge of both the second ply and the intermediate ply.

In a third embodiment, the skirts of the first ply are folded over two superimposed intermediate plies. The second ply has an axial width less than the distance between the free edges on the skirts and is positioned therebetween upon the intermediate plies.

In yet another embodiment, the skirts are folded onto the main portion and an intermediate ply having an axial width less than the distance between the free edges on the skirts is positioned therebetween on the main portion. The second ply is superimposed upon the skirts and the intermediate ply.

While in accordance with the patent statutes preferred and alternative embodiments of the present invention have been described in detail, it is to be understood that the invention is not limited thereto or thereby.

What is claimed is:

1. A pneumatic tire including:
   (a) a carcass having a crown region;
   (b) a tread portion surrounding said crown region; and
   (c) a reinforcement belt disposed circumferentially about said crown region, between said carcass and said tread, said reinforcement belt comprising:
      (i) a first ply of tire cord fabric having its lateral edge portions folded over to form skirts with the balance of said first ply forming a main portion having an axial width of said reinforcement belt, and
      (ii) a second ply of tire cord fabric positioned with respect to said main portion to clamp said main portion onto said carcass and impart to said carcass in said crown region a substantially flat-cross sectional configuration, said cords forming an angle of substantially 0° with respect to the equatorial plane of said pneumatic tire, said tire further including a first intermediate ply of tire cord fabric wherein said cords are oriented at an angle of from about 16° to about 32° with respect to the equatorial plane of said pneumatic tire superimposed upon said main portion and a second intermediate ply of tire cord fabric wherein said cords are oriented at an angle of from about at least 32° to about 70° with respect to the equatorial plane of said pneumatic tire, said skirts folded onto said first and second intermediate plies, said second ply having an axial width less than the axial distance between said free edges on said intermediate plies.

2. The pneumatic tire in accordance with claim 1 wherein said cords in said first ply are oriented at an angle of from about 16° to about 32° with respect to the equatorial plane of said pneumatic tire.

3. The pneumatic tire in accordance with claim 1 wherein said cords in said second ply are textile cords.

4. A pneumatic tire including:
(a) a carcass having a crown region;
(b) a tread portion surrounding said crown region; and
(c) a reinforcement belt disposed circumferentially about said crown region, between said carcass and said tread, said reinforcement belt comprising:
 (i) a first ply of tire cord fabric having its lateral edge portions folded over to form skirts with the balance of said first ply forming a main portion having an axial width of said reinforcement belt; and
 (ii) a second ply of tire cord fabric positioned with respect to said main portion to clamp said main portion onto said carcass and impart to said carcass in said crown region a substantially flat cross-sectional configuration, said cords forming an angle of substantially 0° with respect to the equatorial plane of said pneumatic tire, said tire further including an intermediate ply of tire cord fabric wherein said cords are oriented at an angle of from about 16° to about 32° with respect to the equatorial plane of said tire, said intermediate ply having an axial width less than the axial distance between said free edges of said skirts so that said intermediate ply may be positioned therebetween on said main portion, said second ply having an axial width greater than the axial distance between said free edges on said skirts and superimposed upon said skirts and said intermediate ply.

5. The pneumatic tire in accordance with claim 4 wherein said cords in said first ply are oriented at an angle of from about 16° to about 32° with respect to the equatorial plane of said pneumatic tire.

6. The pneumatic tire in accordance with claim 4 wherein said cords in said second ply are textile cords.

* * * * *